(12) United States Patent
He

(10) Patent No.: US 7,089,454 B2
(45) Date of Patent: Aug. 8, 2006

(54) CAUSING A TRANSACTION TO FAIL AT A PREDETERMINED TRANSACTION STATE

(75) Inventor: Xiaoqiu He, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 575 days.

(21) Appl. No.: 10/231,645

(22) Filed: Aug. 30, 2002

(65) Prior Publication Data

US 2004/0044926 A1    Mar. 4, 2004

(51) Int. Cl.
*G06F 11/00* (2006.01)

(52) U.S. Cl. .................................... 714/38; 717/124
(58) Field of Classification Search ............ 714/38, 714/37, 39, 47; 717/124, 126, 127, 131
See application file for complete search history.

(56) References Cited

U.S. PATENT DOCUMENTS

| 5,812,758 A  | * | 9/1998  | Laureanno ............... 714/46 |
| 6,173,440 B1 | * | 1/2001  | Darty ..................... 717/130 |
| 6,205,561 B1 | * | 3/2001  | Santerre et al. .......... 714/36 |
| 6,314,532 B1 | * | 11/2001 | Daudelin et al. ......... 714/38 |
| 6,430,706 B1 | * | 8/2002  | Santerre et al. .......... 714/36 |
| 6,725,399 B1 | * | 4/2004  | Bowman ................. 714/38 |
| 6,839,894 B1 | * | 1/2005  | Joshi et al. .............. 717/130 |

* cited by examiner

*Primary Examiner*—Nadeem Iqbal
(74) *Attorney, Agent, or Firm*—Hickman Palermo Truong & Becker, LLP

(57) ABSTRACT

A mechanism is provided for causing a transaction to fail at a predetermined transaction state. A transaction coordinator is instructed to process a transaction until the transaction has reached a predetermined transaction state. The transaction coordinator is caused to fail while the transaction is in the predetermined transaction state. Failure of the transaction at the predetermined transaction state is thereby effectuated.

16 Claims, 4 Drawing Sheets

CAUSING A TRANSACTION TO FAIL AT A PREDETERMINED TRANSACTION STATE

FIELD OF THE INVENTION

The present invention relates to computer software testing. More specifically, the present invention relates to causing a transaction to fail at a predetermined transaction state.

BACKGROUND OF THE INVENTION

If a database transaction is specified to be an atomic transaction, then the effect of that transaction on a database must either be entirely complete if that transaction succeeds, or entirely absent if that transaction fails. A partial effect is unsatisfactory. Certain services, such as the Java Transaction Service (JTS), implement a protocol that, when followed, guarantees that any effect of an atomic transaction on a database will be either completed or negated.

When a multi-state transaction is committed, the transaction enters, in turn, each one of a sequence of defined states. For example, JTS implements a sequence of five states: "active," "preparing," "prepared," "completing," and "completed." At any given time when a transaction is in the process of committing, the transaction will be in one of these states. While a transaction is in any of these states, a process involved in the transaction may fail. For example, a client process and a server process may both participate in a transaction (in concert with a JTS process), and either the client or the server may fail. Depending on whether the client or the server failed, and depending on the state of the transaction at the time of the failure, the protocol specifies that the transaction should be either completed or negated.

When a process fails, that process may cease execution. If the protocol specifies that the transaction should be completed, then the failed process should be restarted. The JTS may participate in restarting the failed transaction. As a result of the failed process being restarted, certain modifications (those relating to the transaction) will be made to one or more databases.

If, on the other hand, the protocol specifies that the transaction should not be completed, then the failed process should not be restarted. As a result of the failed process not being restarted, certain modifications will not be made to the one or more databases.

Testing whether the participants in the transaction actually behave according to the protocol can be a difficult task. One problem is how to cause a desired participant to fail during a desired transaction state. Because the states of a transaction transition swiftly, a human user may have great difficulty in manually causing a participant to fail during the desired state. Another problem, given that each transaction participant may or may not be executing after a transaction commits, is how to successively test the behavior of a participant relative to a failure in each state without requiring undue effort from a human user.

SUMMARY OF THE INVENTION

A mechanism is provided for causing a transaction to fail at a predetermined transaction state. A transaction coordinator is instructed to process a transaction until the transaction has reached a predetermined transaction state. The transaction coordinator is caused to fail while the transaction is in the predetermined transaction state. Failure of the transaction at the predetermined transaction state is thereby effectuated.

In one embodiment, the transaction coordinator is restarted. The transaction coordinator is instructed to process a (possibly different) transaction until that transaction has reached a different predetermined transaction state. The transaction coordinator is caused to fail while the transaction is in that different predetermined transaction state. Failure of the transaction at the different predetermined transaction state is thereby effectuated.

In one embodiment, it is determined whether a transaction failure recovery process, implemented in response to the failure of the transaction, achieves a proper transaction recovery result.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

A mechanism for causing a transaction to fail at a predetermined transaction state is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Functional Overview

A mechanism is provided for causing a transaction to fail at a predetermined transaction state. A transaction coordinator is instructed to process a transaction until the transaction has reached a predetermined transaction state. The transaction coordinator is caused to fail while the transaction is in the predetermined transaction state. Failure of the transaction at the predetermined transaction state is thereby effectuated.

Because the transaction coordinator processes the transaction until the transaction is in the predetermined state, the transaction coordinator can be caused to fail during the predetermined state. Thus, a human user avoids the difficulty, caused by the states of a transaction swiftly transitioning, of manually causing the transaction coordinator to fail during the desired state.

In one embodiment, the transaction coordinator is restarted. The transaction coordinator is instructed to process a (possibly different) transaction until that transaction has reached a different predetermined transaction state. The transaction coordinator is caused to fail while the transaction is in that different predetermined transaction state. Failure of the transaction at the different predetermined transaction state is thereby effectuated.

Because the transaction coordinator is restarted and instructed to process a transaction until that transaction has reached a different state, a transaction failure recovery process can be tested relative to a failure in each state of a transaction without requiring undue effort from a human user.

Component parts of an example system for causing a transaction to fail at a predetermined transaction state are next described. Then, a mechanism for causing a transaction to fail at a predetermined transaction state is described with reference to the component parts of the example system.

Example System

Figure 1:
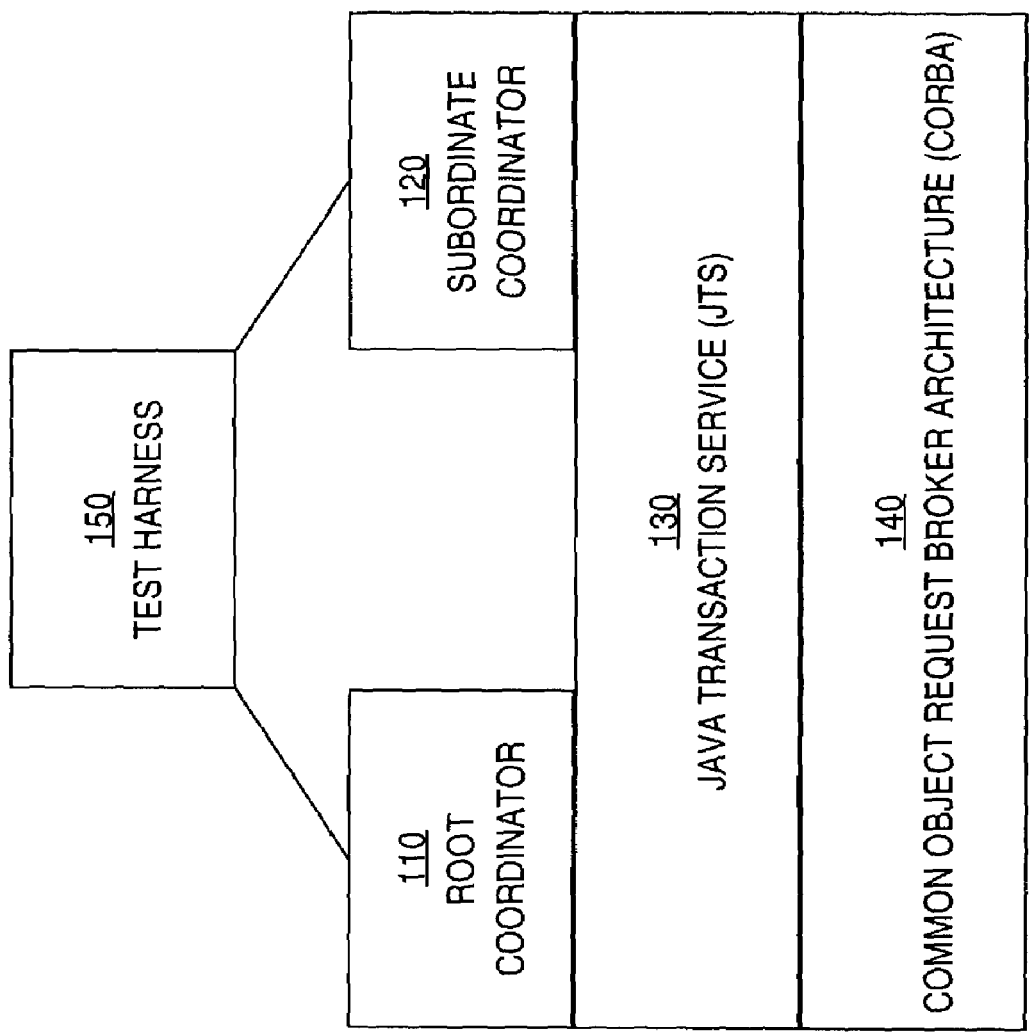
FIG. 1 is a block diagram that illustrates an example system for causing a transaction to fail at a predetermined transaction state, according to one embodiment.

FIG. 1 is a block diagram that illustrates an example system for causing a transaction to fail at a predetermined transaction state, according to one embodiment. The system includes root coordinator 110, subordinate coordinator 120, Java Transaction Service (JTS) 130, Common Object Request Broker Architecture (CORBA) 140, and test harness 150. Each of these may be a process that is capable of concurrently executing on a computer (though not necessarily the same computer). Root coordinator 110 and subordinate coordinator 120 may be referred to as "transaction coordinators."

Root Coordinator 110 and subordinate coordinator 120 "sit on top of" JTS 130. In other words, root coordinator 110 and subordinate coordinator 120 are logically coupled with JTS 130 and are capable of invoking methods of JTS 130 to communicate with each other in a transaction. JTS 130, in turn, "sits on top of" CORBA 140. In other words, JTS 130 is logically coupled with CORBA 140 and is capable of invoking methods of CORBA 140 to facilitate the communication requests of root coordinator 110 and subordinate coordinator 120. Test harness 150 is logically coupled with root coordinator 110 and subordinate coordinator 120.

While JTS 130 is described in the example below, other services may be substituted in place of JTS 130. Similarly, while CORBA 140 is described in the example below, other inter-process communication layers may be substituted in place of CORBA 140. In some embodiments in which a service layer handles inter-process communication itself, CORBA 140 may be entirely absent.

Transaction Coordinators 110–120

Root coordinator 110 is a client process for purposes of a transaction. Subordinate coordinator 120 (so called because it is subordinate to root coordinator 110) is a server process for purposes of a transaction.

In one embodiment, transaction coordinators 110–120 are configured to process a transaction until the transaction reaches a predetermined transaction state. Transaction coordinators 110–120 are configured to not process the transaction beyond the predetermined transaction state.

In one embodiment, transaction coordinators 110–120 are configured to receive a parameter. The parameter indicates that a transaction is to be processed until the transaction reaches a predetermined transaction state.

In one embodiment, transaction coordinators 110–120 include failure-inducing functionality. For example, failure-inducing functionality may include a crash method. Such failure-inducing functionality may cause a transaction coordinator to terminate execution (i.e., to crash). Termination of the transaction coordinator in this manner may cause a transaction being processed by that transaction coordinator to fail.

In one embodiment, each of transaction coordinators 110–120 may include multiple threads. One of the threads may be configured to process a transaction. Another of the threads may be configured to carry out the failure-inducing functionality described above.

JTS 130

JTS 130 is a process that is configured to provide services to root coordinator 110 and subordinate coordinator 120. JTS 130 includes methods that may be invoked by root coordinator 110 and subordinate coordinator 120 so that these may communicate with each other. JTS 130 is configured to invoke methods of CORBA 140 to facilitate the requests of root coordinator 110 and subordinate coordinator 120. JTS defines a protocol that specifies how each of the transaction coordinators 110–120 should behave in the event of a failure at any given state of a transaction.

For example, in one embodiment, once a transaction is committed, the transaction may be in one of five states: "active," "preparing," "prepared," "completing," and "completed." The protocol specifies that if root coordinator 110 fails during the "active" or "preparing" states, then JTS 130 should not restart root coordinator 110, and no data should be inserted into a database. The protocol specifies that if root coordinator 110 fails during the "prepared," "completing," or "completed" states, then JTS 130 (with the participation of subordinate coordinator 120) should restart root coordinator 110, and some data should be inserted into the database. That data indicates the state of the transaction and the coordinator that failed.

The protocol specifies that if subordinate coordinator 120 fails during the "active," "preparing," or "prepared" states, then JTS 130 should not restart subordinate coordinator 120. The protocol specifies that if subordinate coordinator 110 fails during the "prepared," "completing," or "completed" states, then JTS 130 (with the participation of subordinate coordinator 120) should restart root coordinator 110. The protocol specifies that if subordinate coordinator 120 fails during the "active" or "preparing" states, then no data should be inserted into the database. The protocol specifies that if subordinate coordinator 120 fails during the "prepared," "completing," or "completed" states, then some data should be inserted into the database. That data indicates the state of the transaction and the transaction coordinator that failed.

Test Harness 150

Test harness 150 is a testing process. Test harness 150 is configured to instruct one of transaction coordinators 110–120 to process a transaction until the transaction has reached a predetermined transaction state. Testing harness 150 is also configured to cause one of transaction coordinators 110–120 to fail while a transaction is in a predetermined transaction state, thereby effectuating a failure of the transaction at the predetermined transaction state.

In one embodiment, test harness 150 is configured to pass a parameter to one of transaction coordinators 110–120. The parameter indicates that the transaction is to be processed until the transaction reaches the predetermined transaction state.

In one embodiment, test harness 150 is configured to wait for a sufficient amount of time to enable one of transaction coordinators 110–120 to process a transaction to a predetermined transaction state. For example, each transaction state may be associated with a unique duration of time that has been predetermined to be long enough for one of transaction coordinators 110–120 to process a transaction to that transaction state.

In one embodiment, test harness 150 is configured to invoke a failure-inducing functionality of one of transaction coordinators 110–120. For example, test harness 150 may be configured to invoke a crash method of one of transaction coordinators 110–120.

In one embodiment, test harness 150 is configured to restart one of transaction coordinators 110–120 (e.g., after one of transaction coordinators 110–120 terminates execution). Test harness 150 is configured to instruct the restarted transaction coordinator to process a (possibly different) transaction until that transaction has reached another, different predetermined transaction state. Test harness 150 is configured to cause the restarted transaction coordinator to fail while the transaction is in the different predetermined transaction state, thereby effectuating a failure of the transaction at the different predetermined transaction state.

In one embodiment, test harness 150 is configured to determine whether a transaction failure recovery process (e.g., defined by the JTS), implemented in response to a failure of a transaction, achieves a proper transaction recovery result. For example, test harness 150 may be configured to determine whether JTS 130 and root coordinator 110 restarted subordinate coordinator 120 after subordinate coordinator 120 failed, and whether the behavior of JTS 130 was in accordance with a specified behavior. Test harness 150 may also be configured to display results based upon this comparison.

Testing Mechansim

Figure 2:
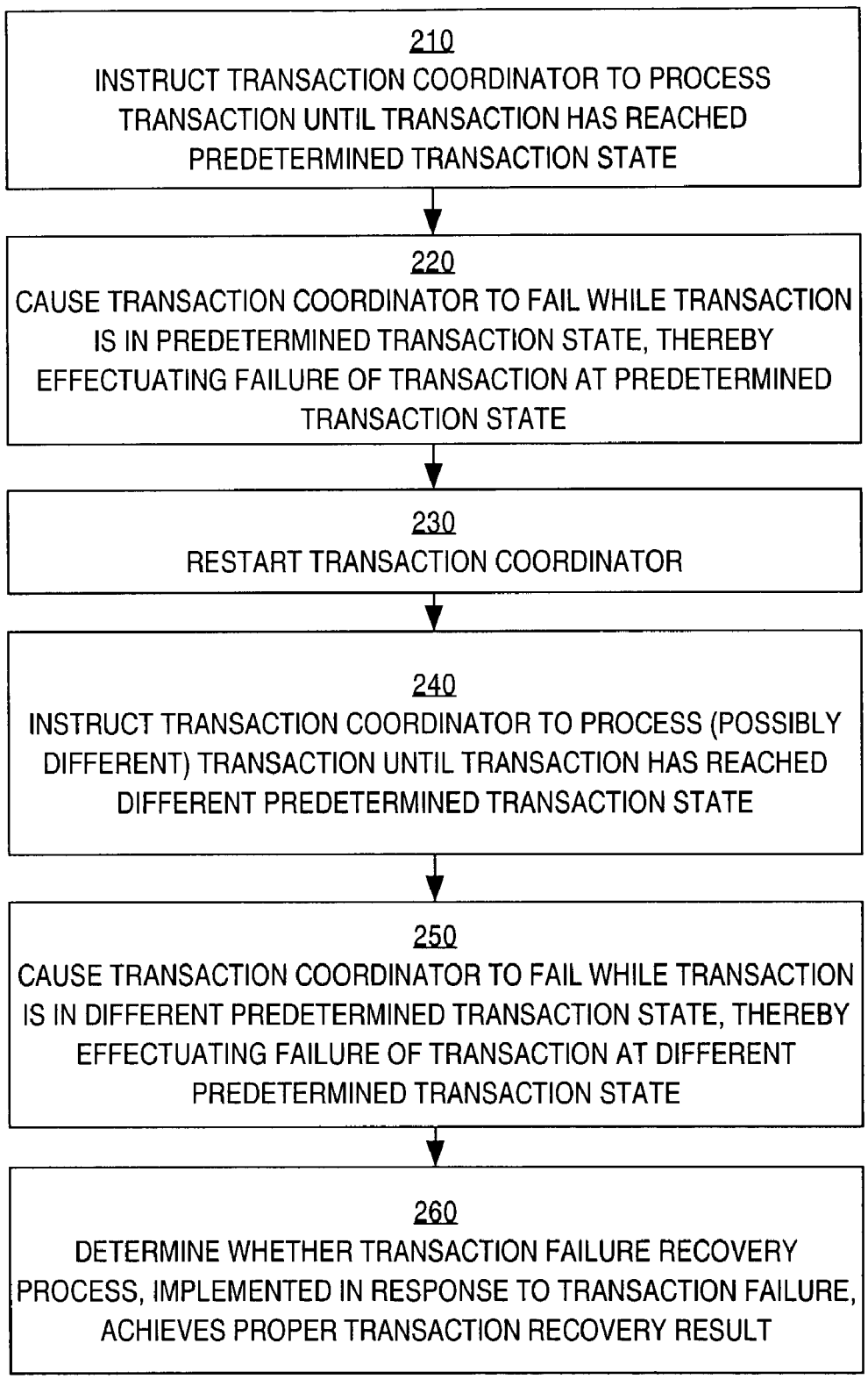
FIG. 2 is a flow diagram that illustrates a mechanism for causing a transaction to fail at a predetermined transaction state, according to one embodiment.

FIG. 2 is a flow diagram that illustrates a mechanism for causing a transaction to fail at a predetermined transaction state, according to one embodiment. In block 210, a transaction coordinator is instructed to process a transaction until the transaction has reached a predetermined transaction state. For example, test harness 150 may instruct root coordinator 110 to process a transaction until the transaction has reached the predetermined transaction state "preparing."

In block 220, the transaction coordinator is caused to fail while the transaction is in the predetermined transaction state. A failure of the transaction at the predetermined transaction state is thereby effectuated. Referring to the example, test harness 150 may cause root coordinator 110 to fail while the transaction is in the predetermined transaction state "preparing."

In one embodiment, in block 230, the transaction coordinator is restarted. Referring to the example, test harness 150 may restart root coordinator 110.

In one embodiment, in block 240, the transaction coordinator is instructed to process a (possibly different) transaction until the transaction has reached a predetermined transaction state that is different than the transaction state referred to in block 210. Referring to the example, test harness 150 may instruct root coordinator 110 to process a transaction until the transaction has reached the predetermined transaction state "prepared."

In one embodiment, in block 250, the transaction coordinator is caused to fail while the transaction is in the different predetermined transaction state. A failure of the transaction at the different predetermined transaction state is thereby effectuated. Referring to the example, test harness 150 may cause root coordinator 110 to fail while the transaction is in the predetermined transaction state "prepared."

In one embodiment, in block 260, it is determined whether a transaction failure recovery process, implemented in response to a failure of the transaction, achieves a proper transaction recovery result. In other words, it is determined whether the transaction failure recovery process produced a result consistent with a result specified for the transaction state and failed transaction coordinator. Referring to the example, test harness 150 may determine whether JTS 130 and subordinate coordinator 110 restarted root coordinator 110 after root coordinator 110 failed, and whether the behavior of JTS 130, in that regard, was in accordance with a specified behavior. Test harness 150 may also display results based upon this comparison.

Figure 3:
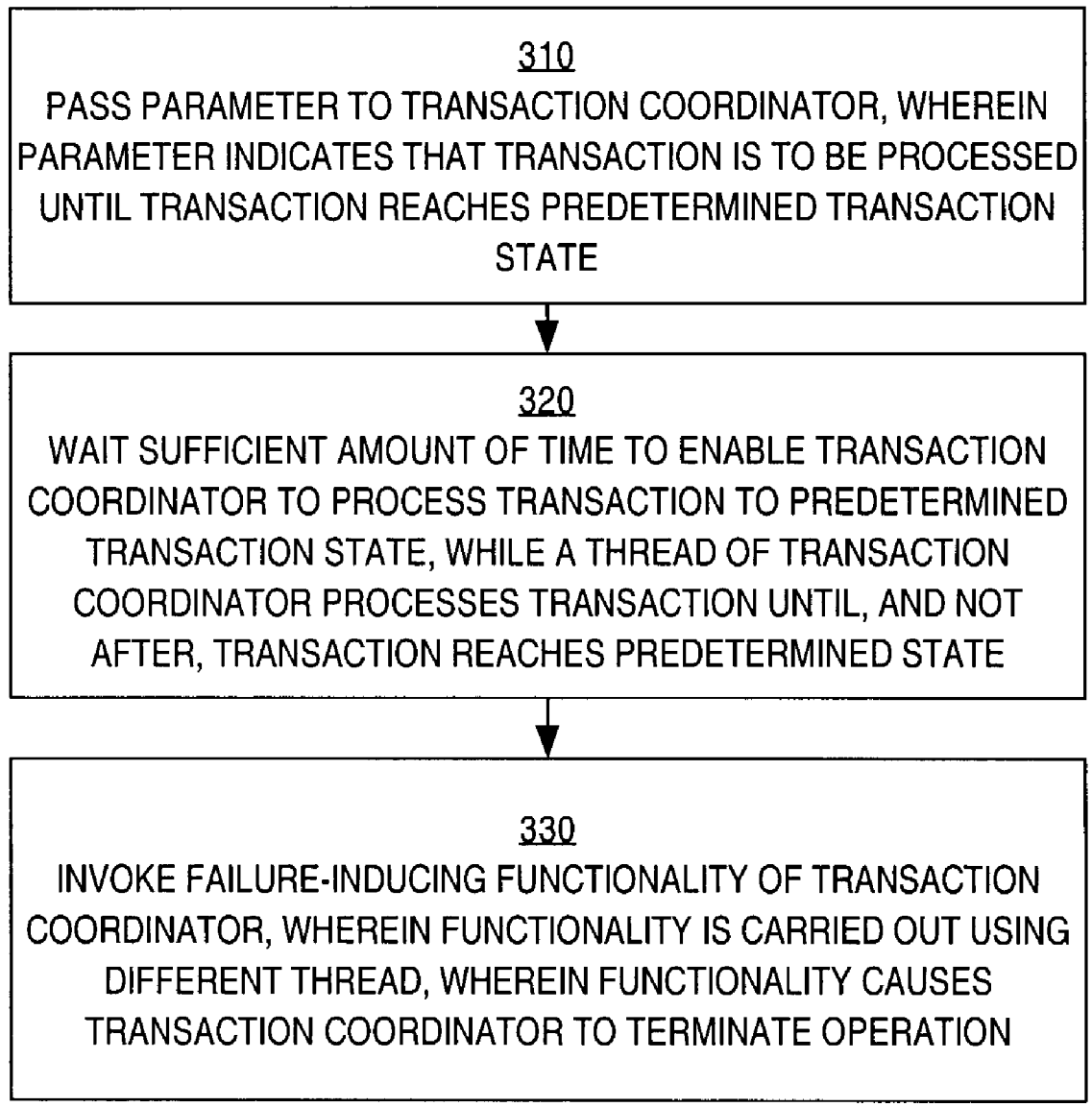
FIG. 3 is a flow diagram that illustrates a mechanism for instructing a transaction coordinator to process a transaction until the transaction has reached a predetermined transaction state, and for causing the transaction coordinator to fail while the transaction is in the predetermined transaction state, according to one embodiment.

FIG. 3 is a flow diagram that illustrates a mechanism for instructing a transaction coordinator to process a transaction until the transaction has reached a predetermined transaction state, and for causing the transaction coordinator to fail while the transaction is in the predetermined transaction state, according to one embodiment. In one embodiment, blocks 210–220 of the above mechanism include blocks 310–330 of the mechanism described below.

In one embodiment, in block 310, a parameter is passed to the transaction coordinator. The parameter indicates that the transaction is to be processed until the transaction reaches the predetermined transaction state. Referring to the example, test harness 150 may pass, to root coordinator 110, a parameter that indicates that the transaction is to be processed until the transaction reaches the "preparing" state.

In one embodiment, in block 320, a sufficient amount of time is waited to enable the transaction coordinator to process the transaction to the predetermined transaction state, while a thread of the transaction coordinator processes the transaction until, and not after, the transaction reaches the predetermined state. Referring to the example, test harness 150 may wait for a duration of time that is predetermined to be sufficient for root coordinator 110 to process the transaction to the "preparing" state. A thread of root coordinator 110, having been instructed by test harness 150 to process the transaction to the "preparing" state, may process the transaction to the "preparing" state and no further.

In one embodiment, in block 330, a failure-inducing functionality of the transaction coordinator is invoked. In one embodiment, a different thread than the thread referred to in block 320 carries out the failure-inducing functionality. In one embodiment, the failure-inducing functionality causes the transaction coordinator to terminate operation. Referring to the example, test harness 150 may invoke a failure-inducing functionality of root coordinator 110. One thread of root coordinator 110 may process the transaction, and a different thread of root coordinator 110 may execute the failure-inducing functionality. The invocation of the failure-inducing functionality may cause root coordinator 110 to terminate operation.

While the above example refers to causing root coordinator 110 to fail, and restarting root coordinator, the same mechanism applied to root coordinator 110 may be similarly applied to subordinator coordinator 120.

Example Test

An example of the above mechanism being used to test JTS 130 is described below. Test harness 150 instructs root coordinator 110 to process a transaction to an "active" state and then fail. Root coordinator 110 responsively fails at the "active" state. Test harness 150 then restarts root coordinator 110.

Next, test harness 150 instructs root coordinator 110 to process the transaction to a "preparing" state and then fail. Root coordinator 110 responsively fails at the "preparing" state. Test harness 150 then restarts root coordinator 110.

Next, test harness 150 instructs root coordinator 110 to process the transaction to a "prepared" state and then fail. Root coordinator 110 responsively fails at the "prepared" state. Test harness 150 then restarts root coordinator 110.

Next, test harness 150 instructs root coordinator 110 to process the transaction to a "completing" state and then fail. Root coordinator 110 responsively fails at the "completing" state. Test harness 150 then restarts root coordinator 110.

Next, test harness 150 instructs root coordinator 110 to process the transaction to a "completed" state and then fail. Root coordinator 110 responsively fails at the "completed" state.

Next, test harness 150 instructs subordinate coordinator 120 to process the transaction to the "active" state and then fail. Subordinate coordinator 120 responsively fails at the "active" state. Test harness 150 then restarts subordinate coordinator 120.

Next, test harness 150 instructs subordinate coordinator 120 to process the transaction to the "preparing" state and then fail. Subordinate coordinator 120 responsively fails at the "preparing" state. Test harness 150 then restarts subordinate coordinator 120.

Next, test harness 150 instructs subordinate coordinator 120 to process the transaction to the "prepared" state and then fail. Subordinate coordinator 120 responsively fails at the "prepared" state. Test harness 150 then restarts subordinate coordinator 120.

Next, test harness 150 instructs subordinate coordinator 120 to process the transaction to the "completing" state and then fail. Subordinate coordinator 120 responsively fails at the "completing" state. Test harness 150 then restarts subordinate coordinator 120.

Next, test harness 150 instructs subordinate coordinator 120 to process the transaction to the "completed" state and then fail. Subordinate coordinator 120 responsively fails at the "completed" state.

Throughout the above operations, test harness 150 may monitor the behavior of the JTS 130 relative to the failures of the transaction coordinators 110–120. Test harness 150 may produce a report based on such monitoring.

Hardware Overview

Figure 4:
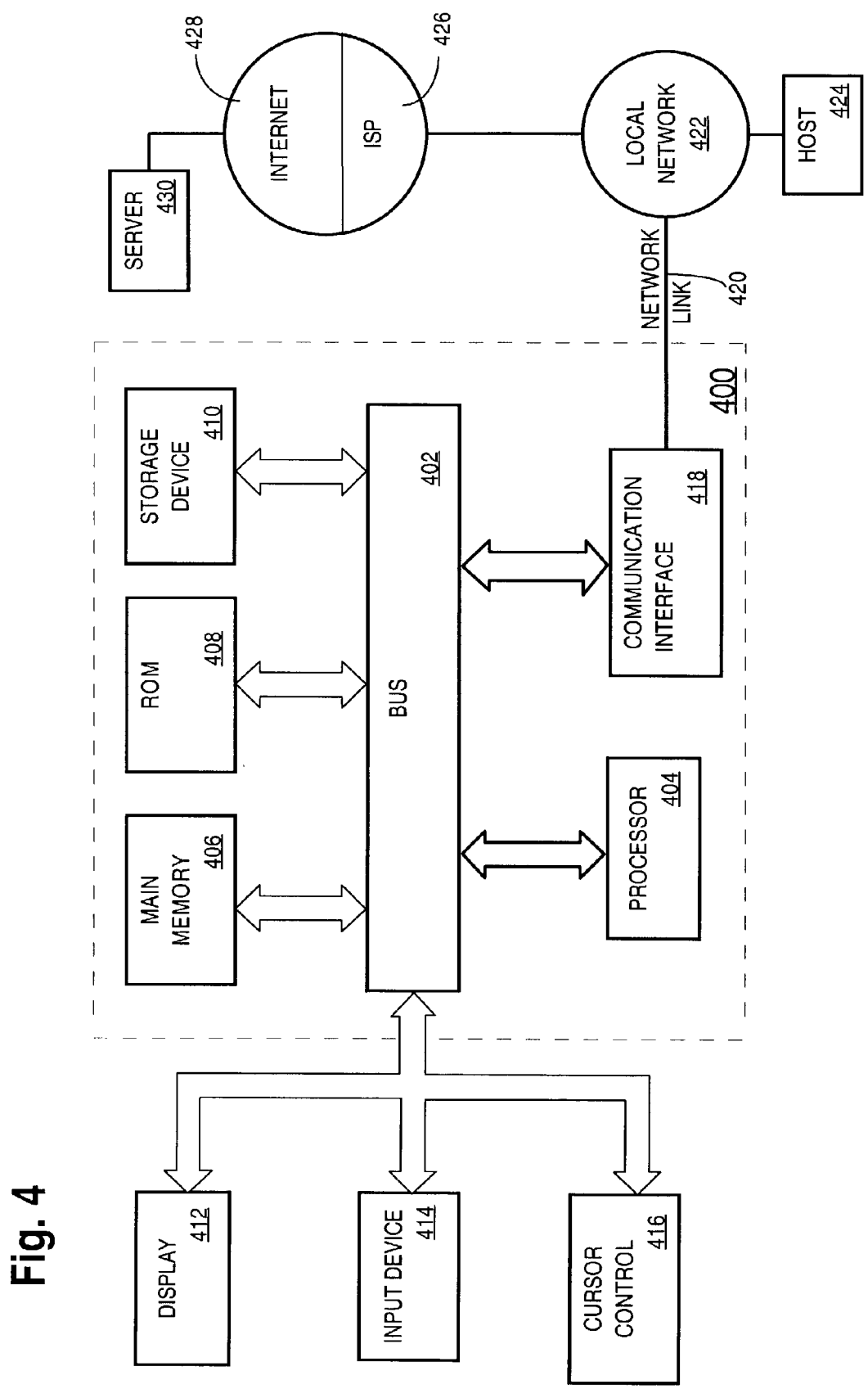
FIG. 4 is a block diagram that illustrates a computer system 400 upon which an embodiment of the invention may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

Processor 404 may execute the received code as it is received, and/or stored in storage device 410, or other non-volatile storage for later execution. In this manner, computer system 400 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A computer implemented method for causing a transaction to fail at a predetermined transaction state, comprising:
   instructing a transaction coordinator to process a first transaction until said first transaction has reached a first predetermined transaction state;
   causing the transaction coordinator to fail while said first transaction is in said first predetermined transaction state, thereby, effectuating failure of said first transaction at said first predetermined transaction state;
   restarting the transaction coordinator;
   instructing the transaction coordinator to process a second transaction until said second transaction has reached a second predetermined transaction state; and
   causing the transaction coordinator to fail while said second transaction is in said second predetermined transaction state, thereby, effectuating failure of said second transaction at said second predetermined transaction state;
   wherein said first transaction and said second transaction may be the same or different transactions; and
   wherein said first predetermined transaction state and said second predetermined transaction state are different transaction states.

2. A computer-readable medium having stored thereon instructions which, when executed by one or more processors, cause the one or more processors to cause a transaction to fail at a predetermined transaction state, said computer readable medium comprising:
   instructions for instructing a transaction coordinator to process a first transaction until said first transaction has reached a first predetermined transaction state,
   instructions for causing the transaction coordinator to fail while said first transaction is in said first predetermined transaction state, thereby, effectuating failure of said first transaction at said first predetermined transaction state;
   instructions for restarting the transaction coordinator;
   instructions for instructing the transaction coordinator to process a second transaction until said second transaction has reached a second predetermined transaction state; and
   instructions for causing the transaction coordinator to fail while said second transaction is in said second predetermined transaction state, thereby, effectuating failure of said second transaction at said second predetermined transaction state;
   wherein said first transaction and said second transaction may be the same or different transactions; and
   wherein said first predetermined transaction state and said second predetermined transaction state are different transaction states.

3. The method of claim 1, wherein instructing the transaction coordinator to process said first transaction comprises:
   passing a first parameter to the transaction coordinator indicating that said first transaction is to be processed until said first transaction reaches said first predetermined transaction state.

4. The method of claim 3, wherein the transaction coordinator processes said first transaction until said first transaction reaches said first predetermined state, and wherein the transaction coordinator does not process said first transaction beyond said first predetermined transaction state.

5. The method of claim 4, wherein causing the transaction coordinator to fail while said first transaction is in said first predetermined transaction state comprises:
   waiting a sufficient amount of time to enable the transaction coordinator to process said first transaction to said first predetermined transaction state.

6. The method of claim 5, wherein causing the transaction coordinator to fail while said first transaction is in said first predetermined transaction state further comprises:
   invoking a failure inducing-functionality of the transaction coordinator.

7. The method of claim 6, wherein processing of said first transaction is carried out using a first thread, and wherein execution of the failure-inducing functionality is carried out using a second thread, wherein said first and second threads are different threads.

8. Method of claim 6, wherein the failure-inducing functionality of the transaction coordinator causes the transaction coordinator to terminate operation.

9. The method of claim 1, further comprising:
   determining whether a transaction failure recovery process, implemented in response to failure of said first transaction, achieves a proper transaction recovery result.

10. The computer-readable medium of claim 2, wherein the instructions for instructing the transaction coordinator to process said first transaction comprise:
   instructions for passing a first parameter to the transaction coordinator indicating that said first transaction is to be processed until said first transaction reaches said first predetermined transaction state.

11. The computer-readable medium of claim 10, wherein the transaction coordinator processes said first transaction until said first transaction reaches said first predetermined state, and wherein the transaction coordinator does not process said first transaction beyond said first predetermined transaction state.

12. The computer-readable medium of claim 11, wherein the instructions for causing the transaction coordinator to fail while said first transaction is in said first predetermined transaction state comprise:
   instructions for waiting a sufficient amount of time to enable the transaction coordinator to process said first transaction to said first predetermined transaction state.

13. The computer-readable medium of claim 12, wherein the instructions for causing the transaction coordinator to fail while said first transaction is in said first predetermined transaction state further comprise:
   instructions for invoking a failure inducing-functionality of the transaction coordinator.

14. The computer-readable medium of claim 13, wherein processing of said first transaction is carried out using a first thread, and wherein execution of the failure-inducing functionality is carried out using a second thread, wherein said first and second threads are different threads.

15. The computer-readable medium of claim 13, wherein the failure-inducing functionality of the transaction coordinator causes the transaction coordinator to terminate operation.

16. The computer-readable medium of claim 2, said computer-readable medium further comprising:
   instructions for determining whether a transaction failure recovery process, implemented in response to failure of said first transaction, achieves a proper transaction recovery result.

* * * * *

UNITED STATES PATENT AND TRADEMARK OFFICE
CERTIFICATE OF CORRECTION

PATENT NO. : 7,089,454 B2  Page 1 of 1
APPLICATION NO. : 10/231645
DATED : August 8, 2006
INVENTOR(S) : Xiaoqiu He It is certified that error appears in the above-identified patent and that said Letters Patent is hereby corrected as shown below:

Col. 10, line 16;
Delete "state," and insert therefor: --state;--

Col. 10, line 65:
Delete "Method" and insert therefor: --The method--

Signed and Sealed this

Twenty-fourth Day of October, 2006

JON W. DUDAS
*Director of the United States Patent and Trademark Office*